Patented July 15, 1947

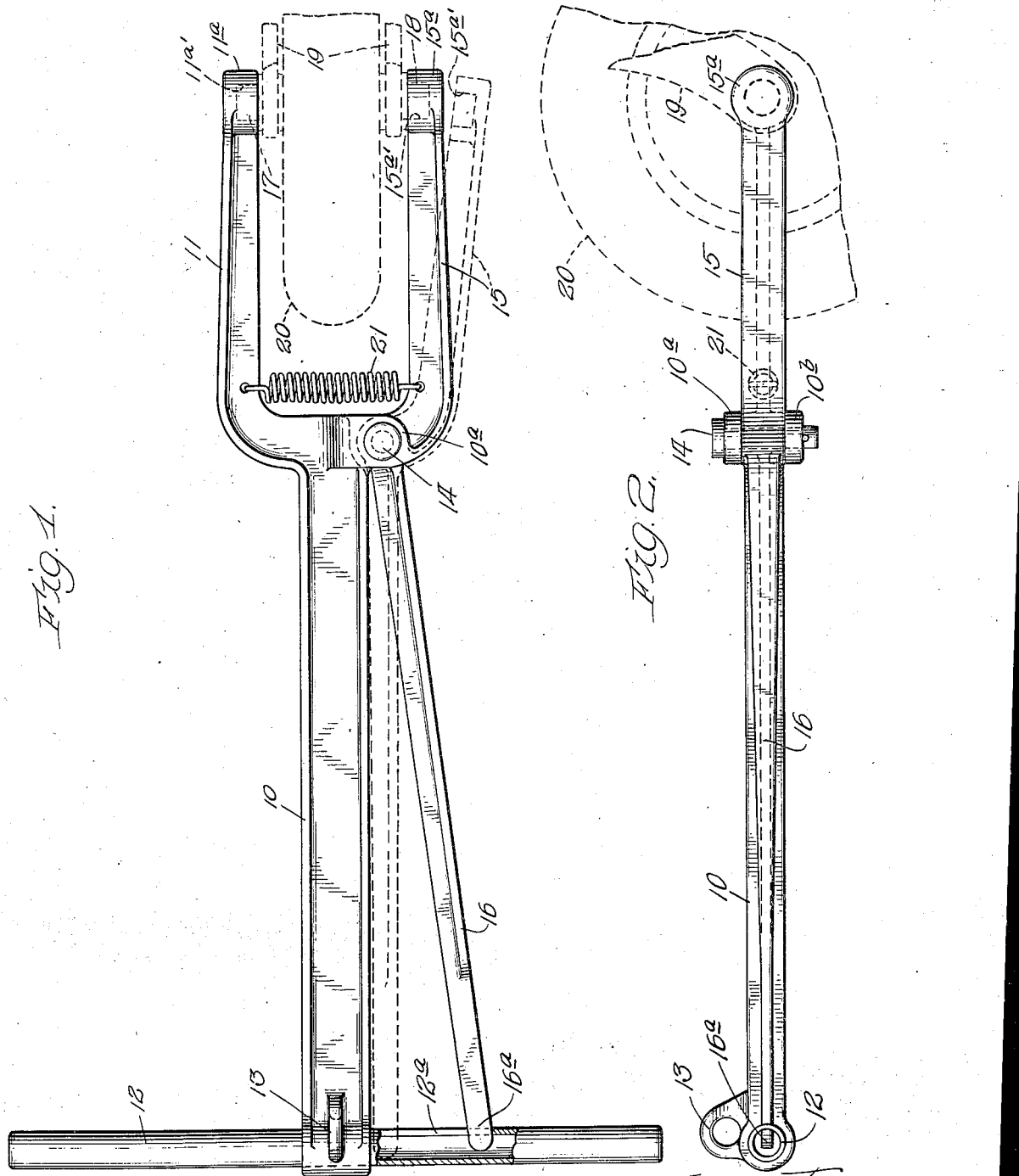

2,424,095

UNITED STATES PATENT OFFICE 2,424,095

TOWING BAR

Arthur Horton, Chicago, Ill.

Application May 11, 1945, Serial No. 593,303

7 Claims. (Cl. 280—47)

This invention relates to a towing bar, and more particularly to means for pulling an airplane or other vehicle having a swivelably mounted wheel.

One feature of this invention is that it provides a simple rugged towing bar which can be easily handled and which is adapted to be clamped over a mounting part, as the axle nuts, of the nose wheel of an airplane to enable it to be easily pulled in and out of a hangar or otherwise moved about under conditions where it is not desirable to use its own power.

Another feature of this invention is that engagement and disengagement of the towing bar with the wheel mounting may be very quickly and easily effected; still another feature of this invention is the provision of spring means normally holding the jaw members of the device in operative engagement with a mounting part such as an axle nut; a further feature of this invention is the provision of a direct acting operating lever so arranged that one end thereof is near the transverse handle member of the towing bar, so that a hand positioned on the towing bar may maintain the operating lever in a desired position to provide positive holding means, supplementing the spring, for holding the jaws in place; and still a further feature of this invention is that the towing bar may be used for power towing where desired. Other features and advantages of this invention will be apparent from the following specification and the drawing, in which:

Figure 1 is a top plan view of one embodiment of my invention, partly broken away, showing the movable jaw member in axle engaging position in solid lines and in disengaged position in dotted lines; and Figure 2 is a side view of the device shown in Figure 1.

While the towing bar here illustrated and claimed has other uses, it was particularly designed for and its operation will be described in connection with a light airplane of the type having a steerable or swivelably mounted nose wheel. In moving such an airplane into and out of a hangar, in lining it up in close quarters with other airplanes on a runway apron, or the like, it is conventional not to use the power of the plane itself, but to tow it manually, by a light tractor, or the like. Where towing is done merely by hooking on a chain or rope, the towing or pulling must be done by one man and steering by another man; and if the plane is to be pushed merely by pushing against the wings or the like, two men are again necessary properly to handle the plane, despite the fact that many light planes can be easily pulled along by one man. There have been some previous efforts to provide a towing bar or pulling means which could be clamped on to the swivelable wheel of a plane, but these have usually been cumbersome, slow and relatively difficult to manipulate, and unsatisfactory for other reasons.

I have provided a very simple yet effective towing bar comprising two principal parts, one such part comprising a jaw member and operating lever, this part being pivotally mounted on the other part comprising an elongated body portion having another jaw member rigidly mounted on one end thereof and pulling means mounted at the other end thereof, as a transverse handle or connector means for power towing, or both; and maintenance of the jaws in desired operative engagement with a wheel mounting part, as the axle nuts, is effected principally by a spring pulling the jaw members together.

Referring now more particularly to the specific embodiment of my invention illustrated herewith, the towing bar is shown as comprising an elongated body portion 10, which may for example be about 28 or 30 inches long, with a jaw member 11 rigidly mounted on one end thereof, and with pulling means on the other end thereof. This pulling means is here shown as comprising a transversely extending handle member 12, here shown as in the form of a pipe which may be 20 or 24 inches long, and a connector ring 13 is provided for power towing where a light tractor, automobile or the like is to do the pulling. While these parts may be initially made and assembled in any desired manner, I prefer to form the jaw member and body portion integrally in a single member and to weld the handle member to the end of the body portion.

The right-hand end of the elongated body portion 10 (speaking with respect to the position of the parts as shown in the drawing) is provided with a yoke consisting of the parts 10a and 10b, this yoke receiving a pin 14 serving as the pivotal mounting for the other major part of the towing bar. This other part comprises the other jaw member 15 and an operating lever 16, these being preferably integrally cast as a single piece. The operating lever 16 has its other or operating end, here identified as 16a, located in a motion-limiting slot 12a in the transverse handle member 12, as may be best seen in Figure 1. The lever is approximately three times as long as the jaw member 15 moved thereby, so that any force applied to the end 16a of the lever is considerably multiplied at the engaging end of the jaw member 15.

The two jaw members are provided on the inner surfaces of their end portions, here identified as 11a and 15a, with pockets 11a' and 15a', which pockets may be about 1¼ inches in diameter and one inch deep. These pockets are adapted to receive and engage the axle nuts 17 and 18 on the ends of the axle passing through between the ends of the mounting yoke 19 carrying the nose wheel 20 of the plane. A heavy spring 21 is fastened to the two jaw members near their base portion, and serves to pull the ends thereof together with considerable force.

If a light airplane has been landed and taxied up to a position on the apron in front of the hangar, for example, one may quickly and easily pull the plane into the hangar with this towing bar. It is merely necessary to walk up to the nose wheel of the plane, push the lever 16 to the position shown in dotted lines in Figure 1, and place the ends of the jaw members 11 and 15 on each side of the axle nuts 17 and 18. The lever member 16 may then be released and the jaws will move in, closing in on the axle nuts to receive them firmly in the pockets provided for this purpose. The outer end of the handle slot 12a limits the outward movement of the end 16a of the lever, and thus limits the inward movement of the ends of the jaw members 11 and 15, preferably so that the limit of their inward movement is a very small distance, as $\tfrac{1}{16}$ inch, from the wheel yoke. This limiting action enables easier pivoting of the pulling bar in use, and prevents the jaw members from scraping the tire and wheel when the device is being applied or removed. Pulling force may then be applied to the other end of the towing bar and this serves not only to pull the plane but also to direct the movement thereof, as any side component of energy at the pulling end of the towing bar is translated into swivelling movement of the nose wheel. If a man is pulling the plane with this towing bar he would preferably grasp the transverse handle member on each side of the body portion 10, walking backwards, and by having the heel of his right hand against the inside of the end 16a of the operating lever, any chance of the jaw members slipping off of the axle nuts is prevented, as the position of the hand relative to the lever member provides positive locking of the jaw members over the axle nuts. Under all ordinary circumstances the spring 21 is sufficient to maintain the jaw members in desired position during towing, so that towing can be effected merely by connection to the ring 13 when desired. When the plane has been located in the desired position, the towing bar may be very easily removed merely by again pushing the end 16a of the lever member in toward the body portion to move the jaw 15 to the position shown in dotted lines in Figure 1.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A towing bar for an airplane or other vehicle having a swivelably mounted wheel having an axle therethrough with axle ends on each side thereof, including: an elongated body portion; pulling means at one end of the body portion; jaw members at the other end of the body portion, the end of each jaw member including means adapted to make engagement with said axle ends, one jaw member being pivotally mounted on the body portion and the other jaw member being rigidly mounted thereon; and manually operable lever means for moving the pivotally mounted jaw member, the lever means having one end rigidly connected to the jaw member moved thereby.

2. A towing bar for an airplane or other vehicle having a swivelably mounted wheel having axle ends projecting on each side thereof, including: an elongated body portion; pulling means at one end of the body portion, this means comprising a transverse handle member; jaw members at the other end of the body portion each having a pocket therein adapted to receive said axle ends, one jaw member being pivotally mounted on the body portion and the other jaw member being rigidly mounted thereon; and manually operable lever means for moving the pivotally mounted jaw member, the lever means having one end rigidly connected to the jaw member moved thereby and the other end adjacent said handle member.

3. A towing bar for an airplane or other vehicle having a swivelably mounted wheel having axle ends projecting on each side thereof, including: an elongated body portion; pulling means at one end of the body portion; jaw members at the other end of the body portion each having a pocket therein adapted to receive said axle ends, one jaw member being pivotally mounted on the body portion and the other jaw member being rigidly mounted thereon; and manually operable lever means for moving the pivotally mounted jaw member, the lever means having one end rigidly connected to the jaw member moved thereby.

4. A towing bar for an airplane or other vehicle having a swivelably mounted wheel, including: an elongated body portion; pulling means at one end of the body portion, this means comprising a transverse handle member; jaw members at the other end of the body portion adapted to engage a part of the mounting of said wheel, one jaw member being pivotally mounted on the body portion and the other jaw member being rigidly mounted thereon; and manually operable lever means for moving the pivotally mounted jaw member, the lever means having one end rigidly connected to the jaw member moved thereby and the other end adjacent said handle member, the construction and arrangement being such that a hand positioned on the handle member is adapted to hold the lever means in a position maintaining the jaw members in operative engagement with the wheel mounting.

5. A towing bar for an airplane or other vehicle having a swivelably mounted wheel having axle ends projecting on each side thereof, including: an elongated body portion; pulling means at one end of the body portion; jaw members at the other end of the body portion each having a pocket therein adapted to receive said axle ends, at least one jaw member being pivotally mounted on the body portion; manually operable lever means for moving a pivotally mounted jaw member; and spring means urging said jaw members together.

6. A towing bar for an airplane or other vehicle having a swivelably mounted wheel, including: an elongated body portion; pulling means at one end of the body portion, this means comprising a transverse handle member; jaw members at the other end of the body portion adapted to engage a part of the mounting of said wheel, one jaw member being pivotally mounted on the body portion and the other jaw member being rigidly mounted thereon; manually operable lever means for moving the pivotally mounted jaw member, the lever means having one end rigidly connected to the jaw member moved thereby and the other end adjacent said handle member, the construction and arrangement being such that a hand positioned on the handle member is adapted to hold the lever means in a position maintaining the jaw members in operative engagement with the wheel mounting; and spring means urging said jaw members together.

7. A towing bar for an airplane or other vehicle having a swivelably mounted wheel, including: an elongated body portion; pulling means at one end of the body portion, this means comprising a transverse handle member and connector means for power towing; jaw members at the other end of the body portion adapted to engage a part of the mounting of said wheel, one jaw member being pivotally mounted on the body portion and the other jaw member being rigidly mounted thereon; manually operable lever means for moving the pivotally mounted jaw member, the lever means having one end rigidly connected to the jaw member moved thereby and the other end adjacent said handle member, the construction and arrangement being such that a hand positioned on the handle member is adapted to hold the lever means in a position maintaining the jaw members in operative engagement with the wheel mounting; and spring means urging said jaw members together.

ARTHUR HORTON.

REFERENCES CITED

The following references are of record in the file of this patent:

UNITED STATES PATENTS

| Number | Name | Date |
| --- | --- | --- |
| 2,348,741 | Jessen | May 16, 1944 |
| 2,287,955 | Zunino | June 30, 1942 |
| 1,281,762 | Carpenter | Oct. 15, 1918 |